W. B. Johns,
Treating Offal.
No. 111,851. Patented Feb. 14, 1871.
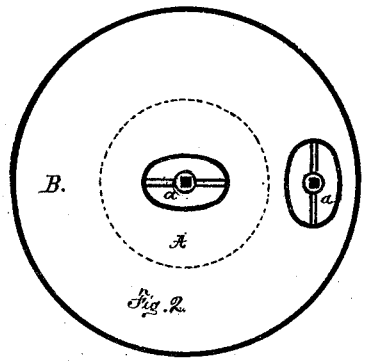
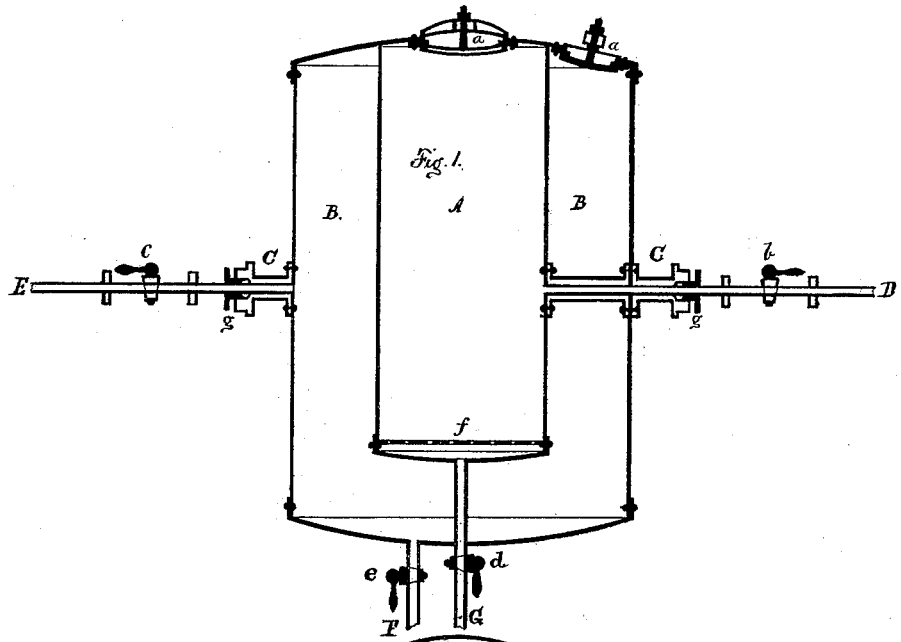
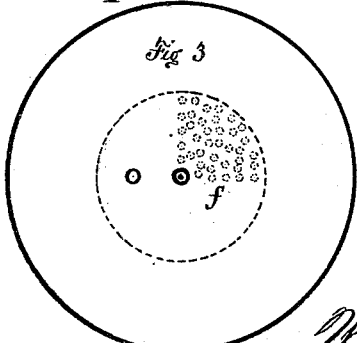
Witness
Jacob R. Massey
James C. Pennypacker
William Burr Johns

UNITED STATES PATENT OFFICE.

WILLIAM BURR JOHNS, OF PHILADELPHIA, PENNSYLVANIA.

IMPROVEMENT IN TREATING BONES, HORNS, HOOFS, &c., FOR MANUFACTURE OF FERTILIZERS.

Specification forming part of Letters Patent No. 111,851, dated February 14, 1871.

*To all whom it may concern:*

Be it known that I, WILLIAM BURR JOHNS, of the city of Philadelphia, in the State of Pennsylvania, have invented a new and Improved Mode of Treating Bones, Horns, Hoofs, and other animal matter; and I hereby declare the following is a full and exact description thereof.

My invention consists of a process for rendering bones, horns, hoofs, and other animal matter perfectly friable and pulverizable, that they may readily be converted into powder or dust for fertilizing land, while at the same time the ammonia and other valuable properties contained in these substances are preserved therein.

For this purpose I subject these bony, horny, or other substances to the action, at the commencement of the operation, of steam, which, for celerity of operation, I prefer to employ superheated, in contact with the substances, and afterward of heat evolved from steam, which, for the same reason above given, I prefer to be superheated, not in contact with the substances, in one continuous and entire operation, completed in one vessel or apparatus.

In the drawing hereunto annexed are shown figures of an apparatus for performing this process speedily and continuously, but which apparatus I do not intend to claim herein as my invention. This apparatus, which I denominate Johns' steam desiccator, consists of an inner and an outer chamber, between which there is no communication, together with necessary pipes, stops, and man-holes. The inner chamber is the receptacle, wherein are placed the bones, horns, hoofs, or substances to be acted upon by steam in contact therewith. The outer chamber is for the admission and retention of steam, from which heat is evolved into the interior chamber, effecting the desiccation of the substances contained in the interior chamber without appreciable loss of the ammonia and other valuable properties in such substances.

The whole apparatus should be made of iron or other metal, steam-tight, and of strength sufficient to sustain a high pressure of superheated steam without deflection or injury more than ordinary wear during long usage.

The exterior chamber may be incased with any suitable non-conducting material to prevent escape of heat.

Figure 1 of the said drawing is a vertical section of the apparatus. Fig. 2 is a view of the upper end or top of the apparatus. Fig. 3 is a view of the perforated plate near the bottom of the interior chamber.

Similar letters in the different figures indicate corresponding parts of the apparatus.

The man-hole $a$ of the interior chamber, A, being removed, I fill that chamber with any of the materials or substances specified and referred to, and both man-holes $a$ $a$ being then securely closed, by turning open the cock $b$ in the supply-pipe D, steam, which, after leaving the generator has been superheated, (by the application of fire to the conducting-pipe or in any of the ordinary and well-known methods,) is introduced into that chamber, in contact with the substances contained therein. The pipe D should remain open and the supply of steam be kept up until the cohesiveness of the substance acted upon is reduced, but not destroyed.

The condensed steam that drips through the perforated plate $f$, which supports the weight of the charge, is drawn off through the waste-pipe G by turning open the cock $d$ from time to time.

I have found, in practice, that this part of the operation will be accomplished with steam at a pressure of sixty pounds to the square inch in the generating-boiler, corresponding, approximately, to a heat of 308° Fahrenheit, in from one and a half to two hours.

The substances being now in condition for drying, steam is shut off from the chamber A by closing the cock $b$, and, by turning on the cock $c$ of supply-pipe E, steam is admitted into the chamber or jacket B, and the supply there is kept up until the operation of desiccation is complete, the condensed steam from that chamber being discharged through the pipe F by turning the cock $e$ at intervals. The length of time steam should be supplied to the chamber B will necessarily depend upon the temperature. With a pressure of ninety pounds to the square inch in the generating-boiler, corresponding to a temperature of 331° Fahrenheit, the supply should be maintained without intermission for four hours. This part of the operation being complete, the man-hole a, at the top of the interior chamber, may immediately be opened, and the substances taken or dumped (the entire apparatus being swung on pivots C C) out, prepared for any process of grinding or pulverizing.

The entire operation may be performed with steam carried directly from the steam-generator, and which has not been superheated before its admission into either of the chambers of the apparatus; but the process so performed will require greater length of time and the result will not be so satisfactory.

I am aware that long since, in England and in this country, bones and other animal matters of like nature have been treated with and without alkalies and diluted acids, by boiling and by steaming the same in a digester, in various methods and for different purposes.

I am aware, also, that for a long period, in Germany, in England, and elsewhere, bone-dust has been extensively used as a fertilizer, and that mills were erected many years ago for grinding and pulverizing bones which were in their natural state and bones which had previously been dried in kilns, and the product used as a fertilizer. I therefore make no claim to the use of a simple digester for the treatment of bones, horns, hoofs, or other animal matter; neither do I claim as new the use, as a fertilizer, of crushed, ground, or pulverized bones, hoofs, horns, or other animal matter of like nature, whether or not the same have been kiln-dried previous to being crushed, ground, or pulverized; but, Having described the nature of my invention and the method of performing the same, what I claim as new, and desire to secure by Letters Patent, is—

The process of desiccating and rendering friable bones, horns, hoofs, and other animal matter, by subjecting these substances, or any of them, to the action, at the commencement of the operation, of steam in contact therewith, and afterward to the action of heat evolved from steam not in contact with the substances, in one entire and continuous operation, completed in one vessel or apparatus.

WILLIAM BURR JOHNS.

Witnesses:
JACOB R. MASSEY,
JAMES C. PENNYPACKER.